UNITED STATES PATENT OFFICE.

ARTHUR WEINBERG, OF FRANKFORT-ON-THE-MAIN, GERMANY, ASSIGNOR TO LEOPOLD CASSELLA & CO., OF SAME PLACE.

BLACK DYE.

SPECIFICATION forming part of Letters Patent No. 560,449, dated May 19, 1896.

Application filed January 20, 1896. Serial No. 576,120. (No specimens.) Patented in England May 15, 1894, No. 9,529, and in France May 18, 1894, No. 238,621.

*To all whom it may concern:*

Be it known that I, ARTHUR WEINBERG, a citizen of Prussia, and a resident of Frankfort-on-the-Main, Germany, have invented new and useful Improvements in the Production of New Black or Bluish-Black Azo Coloring-Matters, of which the following is a specification.

This invention, for which patents have been obtained in France, No. 238,621, dated May 18, 1894, and in Great Britain, No. 9,529, dated May 15, 1894, relates to the production of new black or bluish-black azo coloring-matters. These dyestuffs are composed of tetrazo compounds which on one side are combined with the following characteristical group:

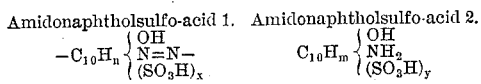

and on their other side with metadiamins or derivatives thereof. They produce very fast black, bluish-black, or grey shades on unmordanted cotton in an alkaline bath and are besides especially valuable for dyeing mixed goods or fabrics composed of animal and vegetable fibers.

In order to carry out this invention, I may proceed in different ways. I combine, for instance, one molecule of a tetrazotized paradiamin—such as benzidin, tolidin, diamidodiphenolether, diamidodiphenylamin — with one molecule of an amidonaphtholsulfo-acid— such as gamma amidonaphtholsulfo-acid, 2.8 amidonaphthol, 3.6 disulfo-acid—in an alkaline solution. The resulting intermediate compound is diazotized again and brought together with a second molecule of an amidonaphtholsulfo-acid, which may be equal to or different from the acid employed before— such as gamma amidonaphtholsulfo-acid, 2.8 amidonaphthol, 3.6 disulfo-acid, 1.8 amidonaphthol mono or disulfo-acid. Although theoretical reasons would lead to the presumption that this second molecule of amidonaphtholsulfo-acid saturates the still free diazo group of the paradiamin, experience has shown that the combination takes place with the diazotized amido group of the first-combined amidonaphtholsulfo-acid. Finally one molecule of a metadiamin or its substitutes—such as metaphenylenediamin, metatoluylenediamin, or the different chrysoidins—is added.

Another method for producing dyestuffs of the new class consists in first combining the diazo derivative of acetparaphenylenediamin with one molecule of an amidonaphtholsulfo-acid in alkaline solution, saponifying the product and tetrazotizing it afterward. The thus-produced tetrazoazo compound is then treated according to the process above described.

I have found besides a third method leading to the same result. Instead of first combining the tetrazo derivative of a paradiamin with one molecule of amidonaphtholsulfo-acid 1, diazotizing and coupling them with the amidonaphtholsulfo-acid 2, first the diazo derivative of the acid 1 may be combined with the acid 2, and afterward one molecule of the tetrazotized paradiamin may be allowed to react on one molecule of the thus-produced azo compound. The resulting substance will also in this case be

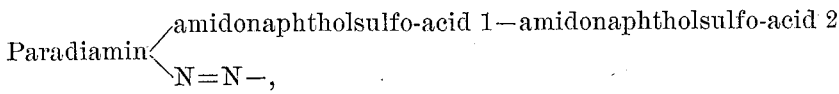

which is to be combined with metadiamins, as above described.

The following examples will serve to illustrate the manner in which the different methods can be carried into practical effect:

Example I: 23.4 parts by weight of dianisidin are tetrazotized in the known manner and introduced into the alkaline solution of twenty-four parts by weight of gamma amidonaphtholsulfo-acid. The intermediate compound is immediately formed. The solution is then acidulated with muriatic acid and seven parts by weight of nitrite are added. As soon as the diazotation is completed the whole is rapidly mixed with a solution of thirty-two parts by weight of 1.8 amidonaphthol 2.4 disulfo-acid, kept alkaline by means of an excess of carbonate of soda. The disulfo-acid will be absorbed in a few minutes. Finally eleven parts by weight of metaphenylenediamin are added. The formation of the dyestuff is completed within about twelve hours. It is then precipitated with common salt, filtered off, and dried.

Example II: Fifteen parts by weight of acetparaphenylenediamin are diazotized with seven parts by weight of nitrite and combined in alkaline solution with thirty-two parts by weight of 2.8 amidonaphthol 3.6 disulfo-acid. From the thus-formed azo body the acetyl group is removed in the known manner and then the diamidoazo body is tetrazotized. The tetrazo compound thus produced is poured into the alkaline solution of twenty-four parts by weight of gamma amidonaphtholsulfo-acid and hereafter 12.5 parts by weight of metatoluylenediamin are introduced. The solution is then heated to about 40° centigrade. The color is precipitated with common salt, filtered off, and dried.

Example III: Twenty-four parts by weight of gamma amidonaphtholsulfo-acid are diazotized with seven parts by weight of nitrite. The yellow diazo body is brought into an alkaline solution of thirty-two parts by weight of 1.8 amidonaphthol, 3.6 disulfo-acid. The solution of the thus-formed mono-azo compound is mixed with the solution of tetrazodiphenylamin obtained from twenty parts by weight of diamidodiphenylamin. The resulting intermediate compound is then allowed to react with eleven parts by weight of metaphenylenediamin. The dyestuff is separated by addition of common salt, filtered off, and dried.

Having now described the nature of my invention and in what manner the same can be performed, what I claim as new, and desire to secure by Letters Patent, is—

1. The process for producing new azo dyes by treating the intermediate compounds formed from one molecule of a tetrazo body and one molecule of an amidonaphtholsulfo-acid, with nitrous acid and combining the thus-produced tetrazoazo compound with one molecule of an amidonaphtholsulfo-acid and one molecule of a metadiamin substantially as described.

2. The process of producing new azo dyes by mixing one molecule of diazotized acetparaphenylenediamin with one molecule of an amidonaphtholsulfo-acid, heating with caustic alkalies in order to remove the acetyl group, treating the diamidoazo body with nitrous acid and combining it first with one molecule of an amidonaphtholsulfo-acid and then with one molecule of a metadiamin substantially as described.

3. The new coloring-matter having the constitution

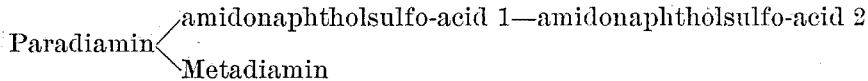

which is a black powder easily soluble in hot water with bluish-black color, insoluble in alcohol, ether or benzene, soluble in concentrated sulfuric acid with a dark-blue color, from which solution a bluish-black precipitate is separated on addition of water; adapted for dyeing unmordanted cotton a deep black as set forth.

In testimony that I claim the foregoing as my invention I have signed my name, in presence of two witnesses, this 6th day of January, 1896.

ARTHUR WEINBERG.

Witnesses:
ALVESTO S. HOGUE,
JEAN GRUND.